(12) United States Patent
Kerbrat

(10) Patent No.: US 8,659,700 B2
(45) Date of Patent: Feb. 25, 2014

(54) METHOD FOR CONVERTING A VIDEO SIGNAL FOR FLICKER COMPENSATION, AND ASSOCIATED CONVERSION DEVICE

(75) Inventor: Jean-Marie Kerbrat, Cuers (FR)

(73) Assignee: IRTS, Toulon (FR)

( * ) Notice: Subject to any disclaimer, the term of this patent is extended or adjusted under 35 U.S.C. 154(b) by 722 days.

(21) Appl. No.: 12/204,209

(22) Filed: Sep. 4, 2008

(65) Prior Publication Data

US 2009/0251595 A1 Oct. 8, 2009

(30) Foreign Application Priority Data

Apr. 3, 2008 (FR) ...................................... 08 52213

(51) Int. Cl.
| | | |
|---|---|---|
| *H04N 7/01* | (2006.01) | |
| *H04N 11/20* | (2006.01) | |
| *H04N 5/00* | (2011.01) | |
| *H04N 5/57* | (2006.01) | |

(52) U.S. Cl.
USPC ............ 348/441; 348/447; 348/607; 348/687

(58) Field of Classification Search
USPC .......... 348/447, 607, 441, 687; 345/102, 204, 345/690
See application file for complete search history.

(56) References Cited

U.S. PATENT DOCUMENTS

| | | | | |
|---|---|---|---|---|
| 4,677,482 A | * | 6/1987 | Lewis, Jr. ...................... | 348/448 |
| 5,325,131 A | * | 6/1994 | Penney .......................... | 348/706 |
| 5,530,484 A | * | 6/1996 | Bhatt et al. ..................... | 348/556 |
| 5,808,697 A | | 9/1998 | Fujimura et al. | |
| 5,910,820 A | * | 6/1999 | Herz et al. ..................... | 348/446 |
| 5,914,753 A | * | 6/1999 | Donovan ....................... | 348/441 |
| 6,084,568 A | * | 7/2000 | Premi et al. .................... | 345/603 |
| 6,130,723 A | * | 10/2000 | Medin ........................... | 348/607 |
| 6,219,101 B1 | * | 4/2001 | Sani et al. ...................... | 348/447 |
| 6,346,970 B1 | * | 2/2002 | Boehlke ........................ | 348/447 |
| 6,819,713 B1 | * | 11/2004 | Sato ......................... | 375/240.12 |
| 6,898,327 B1 | * | 5/2005 | Hrusecky et al. .............. | 382/260 |
| 7,034,887 B2 | * | 4/2006 | Jeffrey et al. ................. | 348/447 |
| 7,102,687 B2 | * | 9/2006 | Nakamoto et al. ............ | 348/446 |
| 7,554,605 B2 | * | 6/2009 | Chang et al. .................. | 348/554 |
| 7,592,996 B2 | * | 9/2009 | Brown et al. ................. | 345/102 |
| 8,049,691 B2 | * | 11/2011 | Pan et al. ......................... | 345/87 |
| 2002/0024481 A1 | | 2/2002 | Kawabe et al. | |
| 2003/0210256 A1 | | 11/2003 | Mori et al. | |
| 2003/0231158 A1 | | 12/2003 | Someya et al. | |
| 2004/0070685 A1 | * | 4/2004 | Kondo et al. ................. | 348/441 |

(Continued)

FOREIGN PATENT DOCUMENTS

WO WO 2007/123628 A1 11/2007

*Primary Examiner* — Brian Yenke

(74) *Attorney, Agent, or Firm* — Patterson Thuente Pedersen, P.A.

(57) ABSTRACT

Method and apparatus for converting a first video signal into a second video signal, including a succession of frames wherein each includes a plurality of points having a luminance. The points of the second video signal can be displayed on corresponding pixels of a display device. The method includes calculating the luminance of a point of a current frame of the second video signal by a weighted sum of a luminance of a corresponding point of a current frame of the first video signal and of a luminance of a corresponding point of a previously stored frame, and storing the luminance of the corresponding point of the current frame of the first video signal. The calculation is repeated for all the points of the current frame of the second video signal, and the storage is repeated for all the points of the current frame of the first video signal.

11 Claims, 1 Drawing Sheet

(56) References Cited

U.S. PATENT DOCUMENTS

2005/0047658 A1* 3/2005 Kita .............................. 382/167
2005/0162436 A1* 7/2005 Van Hook et al. ............ 345/546
2007/0126723 A1 6/2007 Hong
2007/0279372 A1* 12/2007 Brown et al. ................. 345/102
2008/0062309 A1* 3/2008 Zhai et al. ..................... 348/452
2009/0278867 A1* 11/2009 Brown et al. ................. 345/690

* cited by examiner

METHOD FOR CONVERTING A VIDEO SIGNAL FOR FLICKER COMPENSATION, AND ASSOCIATED CONVERSION DEVICE

RELATED APPLICATION

The present application claims priority to French Application No. 08/52213 filed Apr. 3, 2008, which is incorporated herein in its entirety by reference.

TECHNICAL FIELD

The invention relates to the display on a display device (for example of the LCD, Liquid Crystal Display type) comprising a set of pixels.

BACKGROUND

A video signal to be displayed on a display device comprising a set of pixels includes a succession of frames to be displayed each comprising a set of points, each point being associated with one pixel of the screen. The frames to be displayed succeed one another at a rate of around 60 frames/s. Each point is characterized by a luminance defined for example in a format known as RGB (for Red Green Blue) by a binary word (of 24 bits for example) comprising three binary numbers (of 8 bits for example), each corresponding to a luminance value for the three basic colors Red, Green and Blue.

On such a display device, one known problem is the appearance of flashes during a change of frame. These flashes result from significant variations in the luminance of one and the same point from one frame to the next with respect to the luminance of an adjacent point. A white flash appears when the luminance of a point increases significantly from one frame to the other. Conversely, a black flash appears when the luminance of a point decreases significantly from one frame to the other. The appearance of flashes is due at least partly to the difference between the rise time and the fall time of the luminance of a pixel of the screen. The rise time is the time taken by the luminance of a pixel to pass from a first value to a second value greater than the first. Conversely, the fall time is the time taken by the luminance of a pixel to pass from a first value to a second value lower than the first. The rise time and the fall time depend in particular on the type of LCD pixel, on the variations caused by the process of manufacturing the display device, on the magnitude of the jump in luminance (difference between the first luminance value and the second luminance value) to be carried out, on the temperature, on the viewing angle, and other factors.

This problem is particularly disruptive for applications in which the images to be displayed consist essentially of very small objects of one color and/or a very different luminance of a background color of the screen, such as images supplied by a sonar system for example.

Several techniques are envisaged for solving this problem. International Publication No. WO 2007/123628 A1 proposes a technique which consists in inserting, between two frames of a video signal, one or more intermediate frames in which the luminance of the pixels is calculated by a weighted sum of the luminance of the corresponding pixels in the preceding frame and of the luminance of the corresponding pixels in the subsequent frame. The run rate of the frames is thus doubled. The technique of the '628 published application is implemented in the form of a software item which is executed inside a video controller located upstream of a display device.

SUMMARY OF THE INVENTION

The invention proposes an alternative to the above described technique.

To this end, the invention proposes a method for converting a first video signal into a second video signal. The first video signal and the second video signal comprise a succession of frames each comprising a plurality of points characterized by a luminance. The points of the frames of the second video signal are intended to be displayed on corresponding pixels of a display device. The first video signal and the second video signal comprise the same number of frames.

The method according to an embodiment of the invention comprises a step of calculating the luminance ($O_n(i,j)$) of a point ($PO_n(i,j)$) of a current frame of the second video signal ($TO_n$) by a weighted sum of a luminance ($I_n(i,j)$) of a corresponding point ($PI_n(i,j)$) of a current frame of the first video signal ($TI_n$) and of a luminance ($I_n(i,j)$) of a corresponding point ($PI_{n-1}(i,j)$) of a previously stored frame ($TI_{n-1}$), and a step of storing the luminance ($I_n(i,j)$) of the corresponding point ($PI_n(i,j)$) of the current frame of the first video signal ($TI_n$), the calculation step being repeated for all the points of the current frame of the second video signal ($TO_n$), the storage step being repeated for all the points of the current frame of the first video signal ($TI_n$).

Thus, in the method according to an embodiment of the invention, the points of the frames of the second video signal, which are intended to be displayed on the display device, are calculated on the fly during the passage of the first video signal, received for example by a video controller. Furthermore, only one frame of the first video signal is stored, the calculated frames of the second video signal are not stored and no frame of the second video signal is used to calculate the next. In addition, since only the frames of the second video signal are displayed, and since the second video signal comprises the same number of frames as the first video signal, the run rate of the frames of the second video signal is the same as the run rate of the frames of the first video signal.

As a result, the method can be implemented by a suitable device inserted between the video controller and the display device of known systems, without any modification or adaptation of the controller and/or display device of known systems.

In a device according to an embodiment of the invention, the luminance of the points of the frames of the second video signal is calculated on the fly, one point after the other, and the points are displayed immediately on the display device. At any time, only one frame of the first video signal is stored, and the frames of the second video signal are not stored. It is thus possible to limit on the one hand the execution time of the method according to the invention and on the other hand the size of the storage means of the devices which can be used for implementing the method according to the invention.

During the calculation step, the weighted sum can be calculated as follows:
  a first step of multiplying the luminance ($I_n(i,j)$) of the point ($PI_n(i,j)$) of the current frame of the first video signal ($TI_n$) by a first coefficient ($K_1(i,j)$),
  a second step of multiplying the luminance ($I_{n-1}(i,j)$) of the corresponding point ($PI_{n-1}(i,j)$) of the previously stored frame ($TI_{n-1}$) by a second coefficient ($K_2(i,j)$), and
  an addition of the result of the first multiplication to the result of the second multiplication, the result of the addition ($O_n(i,j)$) being the luminance of the corresponding point ($PO_n(i,j)$) of the current frame of the second video signal ($TO_n$).

The calculation step thus comprises two multiplications by a coefficient and one addition. The two multiplications are preferably carried out in parallel, and the addition is preferably carried out in parallel with the multiplications: the addition may in fact be carried out bit by bit as the result bits are output from the multiplication means. Thus, the calculation step can be carried out particularly quickly.

The first multiplication step or the second multiplication step may comprise reading, in a first table (124a) or in a second table (124b), the first coefficient ($K_1(i,j)$) or the second coefficient ($K_2(i,j)$) as a function of the luminance ($I_n(i,j)$) of the point of the current frame of the first signal ($TI_n$) and of the luminance ($I_{n-1}(i,j)$) of the point of the previously stored frame ($TI_{n-1}$). The first table and the second table may be stored either in the device which implements the method according to the invention in a suitable storage means (register, rewritable memory, etc.), or outside the device which implements the method according to the invention. The first solution is generally faster since the time taken to access an internal storage means is generally less than the time taken to access an external storage means.

As mentioned above, the luminance of a point can be defined by a binary number of X bits. In this case, in the method according to the invention, the reading of the first coefficient or of the second coefficient is carried out as a function of X-Y most significant bits of the luminance of the point of the current frame of the first video signal and of X-Y most significant bits of the luminance of the point of the previously stored frame, Y being an integer between 0 and X. Selecting Y=0 makes it possible to associate a first coefficient and a second coefficient with each pair of luminances comprising the luminance of the point of the current frame and the luminance of the corresponding point of the previous frame in the first video signal. Selecting Y=X−1 makes it possible to use a single first coefficient and a single second coefficient regardless of the luminance of the relevant point of the current frame and regardless of the luminance of the corresponding point of the previous frame. The choice of Y is thus a compromise between the size of the storage means in which the tables of coefficients are stored (size inversely proportional to Y) and the quality of flash correction (the quality of correction increases with Y). A compromise may be to select Y=2 to 4 for X=8 bits.

The ambient temperature may be taken into account in the method. To this end, the method according to an embodiment of the invention may comprise a step of selecting, as a function of an ambient temperature, the first table and the second table from among a plurality of first tables and a plurality of second tables, each first table and each second table being associated with a temperature range. This makes it possible to take account of the behavior of the pixels of the display device, which behavior changes as a function of temperature. The step of selecting tables may be carried out at any time, at the start of the method, but also at any time during a processing of a video signal if a change in ambient temperature requires a change of tables.

An embodiment of the invention also relates to a conversion device suitable for implementing the method described above and comprising:
- an input receiver (110) for receiving a luminance ($LI_n(i,j)$) of a point ($PI_n(i,j)$) of a current frame ($TI_n$) of a first video signal,
- a calculation device (120) for calculating on the fly a luminance ($LO_n(i,j)$) of a corresponding point ($PO_n(i,j)$) of a current frame ($TO_n$) of a second video signal by a weighted sum of the luminance ($LI_n(i,j)$) of the received point ($PI_n(i,j)$) and of a previously stored luminance ($LI_{n-1}(i,j)$) of the corresponding point ($PI_{n-1}(i,j)$) of a frame ($TI_{n-1}$) preceding the current frame ($TI_n$) of the first signal, and
- a first storage memory (130) for storing the luminance ($LI_n(i,j)$) of the received point ($PI_n(i,j)$) and of suitable size for storing all the points of a frame,
- an output transmitter (140) for supplying to a display device (200) a result ($LO_n(i,j)$) provided by the calculation device.

In the device according to an embodiment of the invention, a point of a current frame of the second video signal is calculated on the fly from the corresponding point of a current frame of the first video signal and from a corresponding point of a previous frame of the first video signal. The device receives a point of the first signal and supplies as output a corresponding point of the second video signal. The device according to an embodiment of the invention is thus transparent to the devices which surround it, as will be seen more clearly below, and it can easily be inserted between a known display device and an associated known video controller.

The invention will be better understood and other features and advantages will become apparent on reading the following description of an example of embodiment of a method for converting a video signal according to the invention and of an associated conversion device. The description should be read in relation to the appended drawings.

DETAILED DESCRIPTION OF THE DRAWINGS

As has been mentioned above, the method according to the invention converts a first video signal into a second video signal. The first video signal and the second video signal each comprise a succession of frames each comprising a plurality of points characterized by a luminance. The points of the frames of the second video signal are intended to be displayed on corresponding pixels of a display device 200.

In order to make it easier to understand the following explanations, the following definitions are given.

The pair of indices (i,j) indicates the position (row, column) of a relevant point in a frame; it will be said that two points of two different frames correspond if they have the same position (defined by the same pair (i,j)) in their respective frames; it will also be said that two points are adjacent in a given frame if their row index and/or their column index differs by 1.

$TI_n$ is a frame of rank n of the first video signal.

$TO_n$ is a frame of rank n of the second video signal.

$PI_n(i,j)$ is a point of position (i,j) in the frame $TI_n$ of rank n of the first video signal.

A frame of a video signal which is referred to as the "current frame" is the frame currently being processed by the method according to the invention; the frame currently being processed is for example the frame of rank n.

$PO_n(i,j)$ is, in the frame $TO_n$ of rank n of the second video signal, the point corresponding to the point $PI_n(i,j)$.

$LI_n(i,j)$ is the luminance of the point $PI_n(i,j)$.

$LO_n(i,j)$ is the luminance of the point $PO_n(i,j)$.

Figure 2:
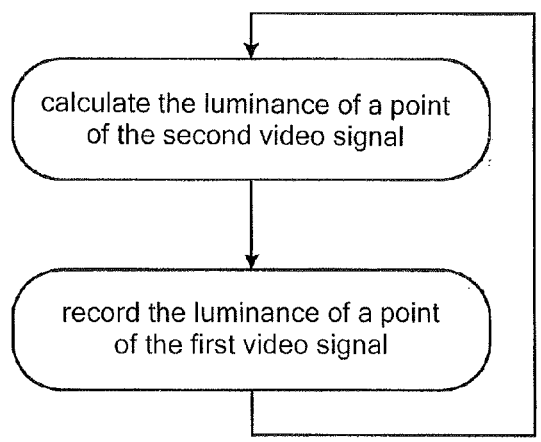
FIG. 2 is a diagram showing the different steps of the method according to an embodiment of the invention.

The method according to an embodiment of the invention includes the steps of (FIG. 2):
- a step of calculating the luminance $LO_n(i,j)$ of a point $PO_n(i,j)$ of a current frame of the second video signal $TO_n$ by a weighted sum of a luminance $LI_n(i,j)$ of a corresponding point $PI_n(i,j)$ of a current frame of the first video signal $TI_n$ and of a luminance $LI_{n-1}(i,j)$ of a corresponding point $PI_{n-1}(i,j)$ of a previously stored frame $TI_{n-1}$, and a step of storing the luminance $LI_n(i,j)$ of the corresponding point $PI_n(i,j)$ of the current frame of the first video signal $TI_n$.

The calculation step is repeated for all the points of the current frame of the second video signal $TO_n$, and the storage step is repeated for all the points of the current frame of the first video signal $TI_n$.

The conversion device according to an embodiment of the invention essentially comprises:

an input receiver 110 for receiving a luminance of a point of a current frame of a first video signal, a calculation device 120 for calculating on the fly a luminance of a corresponding point of a current frame of a second video signal by a weighted sum of the luminance of the received point and of a previously stored luminance of the corresponding point of a frame preceding the current frame of the first signal, and a first storage memory 130 for storing the luminance of the received point in a memory capable of storing all the points of a frame, an output transmitter 140 for supplying to a display device a result provided by the calculation means.

A video controller 50 is generally associated upstream of a display device 200, for example of the LCD type. The video controller is an interface suitable for converting a signal, such as an analogue VGA signal or a digital DVI or HDMI signal, into a digital signal having a format (for example LVDS) that can be used directly by the display device.

In the context of the invention, a device according to an embodiment of the invention is inserted between the video controller 50 and the display device 200.

Figure 1:
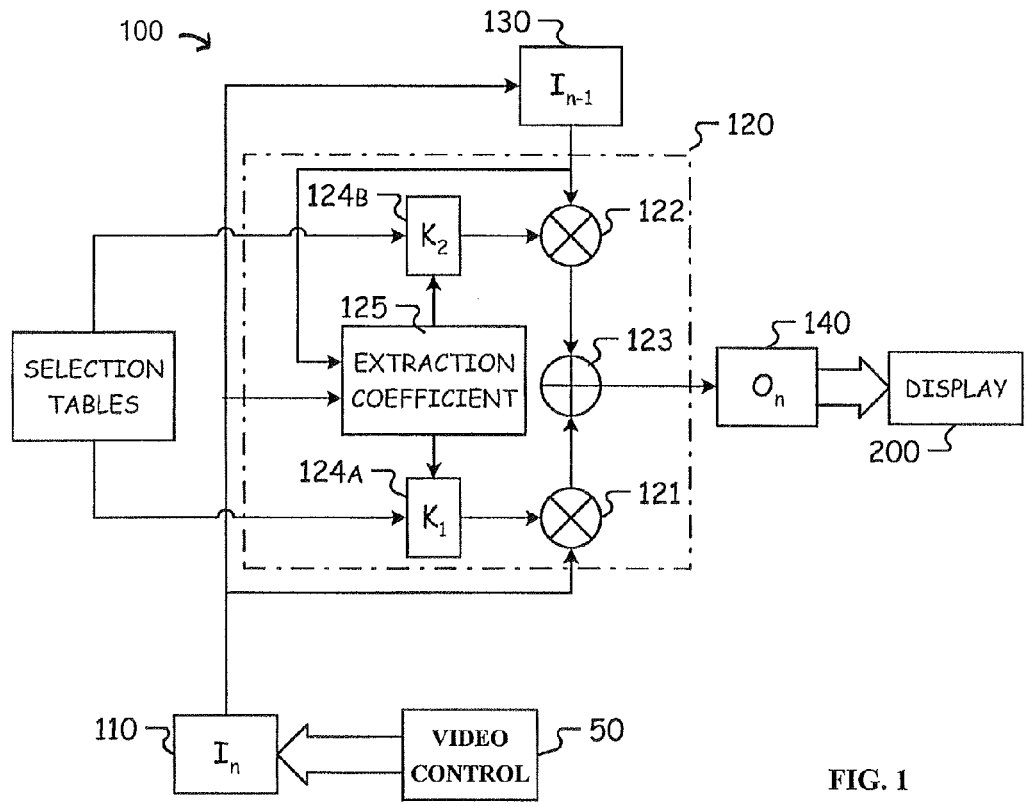
FIG. 1 is a block diagram of a conversion device according to an embodiment of the invention.

In one embodiment, the video controller 50, the conversion device 100 and the display device 200 are all integrated together in a same package, forming a complete display screen, and are associated as represented FIG. 1.

In an other embodiment, the video controller 50, the conversion device 100 and the display device 200 are associated in the same display screen, with switching means. The switching means are adapted to couple the conversion device between the video controller 50 and the display device 200 if the correction of the flicker is desired, or to couple the controller 50 directly to the display device if no correction of the flicker is desired. The switching means may be controlled by the user (via a mechanical switch for example).

In yet an other embodiment, the conversion device is outside a display screen comprising the video controller, the display device and eventually the switching means. For example, in such a display screen, the conversion device may be added like an additional electronic card in a PC.

The input receiver 110 receives the first video signal, for example in an LVDS (Low-Voltage Differential Signaling) format. The input receiver may include a converter for converting the first video signal into a digital signal that can be used by the calculation device 120.

The calculation device 120 is for example a programmable logic circuit such as an FPGA (Field Programmable Gate Array), preferably a reprogrammable circuit.

The first storage memory 130 is suitable for storing a complete data frame of the first video signal. It comprises for example one or more memory banks of sufficient size for storing the luminance of all the points of a frame of a video signal of definition 2560*1600, and a reader for reading from and writing to the memory bank(s).

The output transmitter 140 is symmetrical with the input receiver 110. It includes in particular circuitry for transmitting the second video signal to the display device. It may also comprise a converter for converting the signal produced by the calculation device into a format (for example the LVDS format) which can be used directly by the display device 200.

In the example shown in FIG. 1, the calculation device comprises:

a first multiplication circuit 121 for multiplying the luminance of the received point by a first coefficient, a second multiplication circuit 122 for multiplying the luminance of the previously stored point corresponding to the received point by a second coefficient, an addition circuit 123 for adding a result provided by the first multiplication circuit and a result provided by the second multiplication circuit and for supplying a result to the output means.

The calculation device thus determines the luminance $LO_n(i,j)$ of a point $PO_n(i,j)$ located in the $i^{th}$ row and the $j^{th}$ column of a frame $TO_n$ of the second video signal associated with a received point $PI_n(i,j)$ of a frame $TI_n$ of the first video signal according to the relationship:

$$LO_n = K_1(i,j)*LI_n + K_2(i,j)*LI_{n-1}, \text{ where:}$$

$LI_n$ is the luminance of the received point $PI_n(i,j)$, $LI_{n-1}$ is the luminance of the point $PI_{n-1}(i,j)$ stored in the memory 130 which corresponds (same row, same column or rank in the row) to the received point, $K_1(i,j)$ is the first coefficient and $K_2(i,j)$ is the second coefficient. They are linked by the relationship: $K_1(i,j)+K_2(i,j)=1$.

$LO_n$ is the luminance of the point $PO_n(i,j)$ of the frame $TO_n$ of the second video signal which corresponds (same row, same column) to the received point $PI_n(i,j)$.

It will be noted that, if the luminance of a point is unchanged between two frames of the first video signal, which is the case for example if at least two successive frames are identical, then the calculated luminance $LO_n$ of the point of the second video signal $PO_n$ is identical to the luminance $LI_n$ of the received point of the first video signal $PI_n$. In other words, if $LI_n=LI_{n-1}$, then $LO_n=LI_n=LI_{n-1}$.

If, on the other hand, the luminance of a point of the first video signal changes between two frames of the first video signal, then the calculated luminance $LO_n$ of the point $PO_n$ of the second video signal is intermediate between the luminance $LI_n$ of the received point and the luminance $LI_{n-1}$ of the corresponding stored point.

In another example, if $LI_{n-2}=LI_{n-1}<LI_n=LI_{n+1}$:

$$LO_{n-1}=LI_{n-2}=LI_{n-1}$$

$$LI_{n-1}<LO_n<LI_n$$

$$LO_{n+1}=LI_{n+1}=LI_n$$

In this example, the change in luminance ($LI_{n-1}<LI_n$) between two frames of the first video signal (i.e. one period of the first video signal) has been spread over three frames in the second video signal (i.e. two periods of the second video signal). In the second video signal, the change in luminance is therefore slower, less sudden, and the flashes are thus very considerably attenuated, or even cancelled out, so that the user does not perceive any flashes on the display device.

In the example of FIG. 1, the calculation device 120 also comprises:

a second storage memory 124*a*, 124*b* for storing a first table containing values of the first coefficient and a second table containing values of the second coefficient, and an extraction circuit 125 for extracting the first coefficient $K_1(i,j)$ from the first table and the second coefficient $K_2(i,j)$ from the second table, as a function of the luminance $I_n$ of the received point $PI_n(i,j)$ and of the luminance of the previously stored point corresponding to the received point.

In one embodiment, the first table or the second table comprise as many coefficients as there are pairs of luminances ($LI_n$, $LI_{n-1}$). If the luminance of a point is defined by a binary number of X=8 bits, it can take $2^8=256$ possible values. The first table and the second table therefore comprise for example 256 rows and 256 columns so that a coefficient value $K_1$ or $K_2$ is associated with each pair of luminances ($LI_n$, $LI_{n-1}$).

In another embodiment, the same coefficient value K1 or K2 is associated with several pairs of luminances ($LI_n$, $LI_{n-1}$), having fairly close luminance values $I_n$, $I_{n-1}$. For example, in the case where the luminances are defined by binary numbers of X bits, it is possible to use tables of coefficients comprising $2^{X-Y}$ rows and $2^{X-Y}$ columns, with Y between 0 and X. In this case, the same coefficient is used for $2^X * 2^Y$ pairs of luminances ($LI_n$, $LI_{n-1}$), the same coefficient being associated with luminances $LI_n$, $LI_{n-1}$, for which the X-Y most significant bits are identical. For example, for luminances defined by binary numbers of X=8 bits, it is possible to use tables of coefficients comprising $2^4$ rows and $2^4$ columns, and to use the same coefficient of the table for pairs of luminances ($LI_n$, $LI_{n-1}$) defined by binary numbers for which the 4 most significant bits are the same, i.e. the same coefficient K1 and the same coefficient K2 for 16*16 pairs of values ($LI_n$, $LI_{n-1}$).

In the example of FIG. 1, the device according to an embodiment of the invention also comprises a selector for selecting, as a function of an ambient temperature, the first table and the second table from among a plurality of first tables and a plurality of second tables as a function of the temperature, each first table of the plurality of first tables and each second table of the plurality of second tables being associated with a temperature range, and for storing the first table and the second table in the calculation device 120.

The value of the ambient temperature may be supplied either by a measurement sensor of the device or by an external device which is connected to the device according to an embodiment of the invention by an input/output interface.

The plurality of first tables and the plurality of second tables are stored for example in the storage memory 130, in another storage means inside the device according to the invention, or outside the device according to an embodiment of the invention. In this latter case, the first table and the second table which are selected are transmitted to the selector via an input/output interface 180.

The first and second tables of coefficients are obtained by measurements carried out at different temperatures. The measurement bank comprises, associated in a loop:

a known video controller for transmitting to the display device a first video signal comprising at least two frames to be displayed, a conversion device according to an embodiment of the invention, a known display device, the display of which is intended to be improved with the embodiment of the invention, a measurement device capable of detecting any flash on the display device; the measurement device comprises a photoelectric cell associated with an oscilloscope, a control device for, as a function of a signal received from the photoelectric cell, adjusting a parameter of the first matrix and a parameter of the second matrix, transmitting the modified first matrix and second matrix to the conversion device, and transmitting a new first video signal to the video controller.

The measurement is carried out for example as follows. At least two frames are transmitted to the display device by the video controller: a first frame comprising points having a first luminance $LI_{n-1}$, and a second frame comprising one or more points having a second luminance $LI_n$ which are distributed among a set of points having the first luminance. The frames are converted by the conversion device according to the embodiment of the invention and the resulting second video signal is transmitted to the display device. If a flash is detected by the measurement device, a new measurement is carried out while modifying the luminance $LI_n$. The measurement and the adjustment of the coefficients of the first table and of the second table are repeated for as long as a flash is detected.

When no flash is detected by the photoelectric cell, the last value of the coefficients is retained. If, for certain extreme cases, it is not possible to adjust the value of the coefficients in order to suppress any flash, it could be envisaged to adjust the coefficients in order just to decrease the magnitude of a flash, in terms of amplitude and/or duration, to below a threshold acceptable to the user, even while tolerating a small flash of inverse color, of an amplitude and duration which are also limited to a threshold acceptable to the user. Such extreme cases correspond for example to very considerable changes in luminance of one point between two frames.

The measurement and the adjustment of the coefficients are then repeated for all the coefficients of the first table and of the second table.

At least some of the measurement steps, particularly the last steps which make it possible to fine-tune the value of the coefficients, may be carried out by a person, in order to take account of the differences in perception between the human eye and the measurement device.

The invention claimed is:

1. A method for converting a first video signal into a second video signal, the first video signal and the second video signal comprising a succession of frames each comprising a plurality of points having a luminance, the points of the frames of the second video signal being intended to be displayed on corresponding pixels of a display device, wherein the number of frames and the run rate (frequency) of the two signals is the same, comprising:

calculating the luminance ($LO_n(i,j)$) of a point ($PO_n(i,j)$) of a current frame of the second video signal ($TO_n$, with (i,j) indicating a position of the point and n a frame number, by using only a weighted sum of a luminance ($LI_n(i,j)$) of the corresponding point ($PI_n(i,j)$) at the same position (i,j) of a current frame of the first video signal ($TI_n$) and of a luminance ($LI_{n-1}(i,j)$) of the corresponding point ($PI_{n-1}(i,j)$) at the same position (i,j) of a previously stored previous frame ($TI_{n-1}$) of the first video signal, wherein the weighted sum weights luminance ($LI_n(i,j)$) and luminance ($LI_{n-1}(i,j)$) by coefficients predetermined according to the value of the luminance ($LI_n(i,j)$) and the luminance ($LI_{n-1}(i,j)$), such that a luminance variation of the point ($PO_n(i,j)$) is reduced over time;

storing the luminance ($LI_n(i,j)$) of the corresponding point ($PI_n(i,j)$) of the current frame of the first video signal ($TI_n$);

calculating the luminance being repeated for a plurality of points of the current frame of the second video signal ($TO_n$); and storing the luminance being repeated for a plurality of points of the current frame of the first video signal ($TI_n$).

2. The method according to claim 1, in which the step of calculating the luminance of a point comprises a first step of multiplying the luminance ($LI_n(i,j)$) of the point ($PI_n(i,j)$) of the current frame of the first video signal ($TI_n$) by a first coefficient ($K_1(i,j)$), a second step of multiplying the luminance ($LI_{n-1}(i,j)$) of the corresponding point ($PI_{n-1}(i,j)$) of the previously stored frame ($TI_{n-1}$) by a second coefficient ($K_2(i,j)$), and an addition of the result of the first multiplication to the result of the second multiplication, the result of the addition ($O_n(i,j)$) being the luminance of the corresponding point ($PO_n(i,j)$) of the current frame of the second video signal ($TO_n$).

3. A method according to claim 2, in which the first multiplication step or the second multiplication step comprises reading, in a first table or in a second table, the first coefficient ($K_1(i,j)$) or the second coefficient ($K_2(i,j)$) as a function of the luminance ($LI_n(i,j)$) of the point of the current frame of the first signal ($TI_n$) and of the luminance ($LI_{n-1}(i,j)$) of the point of the previously stored frame ($TI_{n-1}$).

4. A method according to claim 3, in which the luminance of a point is defined by a binary number of X bits, and in which the reading of the first coefficient or of the second coefficient is carried out as a function of X-Y most significant bits of the luminance of the point of the current frame of the first video signal and of X-Y most significant bits of the luminance of the point of the previously stored frame, Y being an integer between 0 and X.

5. A method according to one of claim 3, including the step of selecting, as a function of an ambient temperature, the first table and the second table from among a plurality of first tables and a plurality of second tables, each first table and each second table being associated with a temperature range.

6. A conversion device suitable for implementing the method according to claim 1, comprising:

an input means for receiving a luminance ($LI_n(i,j)$) of a point ($PI_n(i,j)$) of a current frame ($TI_n$) of a first video signal, a calculation means for calculating on the fly a luminance ($LO_n(i,j)$) of a corresponding point ($PO_n(i,j)$) of a current frame ($TO_n$) of a second video signal by a weighted sum of the luminance ($LI_n(i,j)$) of the received point ($PI_n(i,j)$) and of a previously stored luminance ($LI_{n-1}(i,j)$) of the corresponding point ($PI_{n-1}(i,j)$) of a frame ($TI_{n-1}$) preceding the current frame ($TI_n$) of the first signal, and a first storage means for storing the luminance ($LI_n(i,j)$) of the received point ($PI_n(i,j)$) and of suitable size for storing all the points of a frame, an output means for supplying to a display device a result ($LO_n(i,j)$) provided by the calculation means.

7. A conversion device according to claim 6, in which the calculation means comprises:

a first multiplication circuit for multiplying the luminance of the received point by a first coefficient, a second multiplication circuit for multiplying the luminance of the previously stored point corresponding to the received point by a second coefficient, an addition circuit for adding a result provided by the first multiplication circuit and a result provided by the second multiplication circuit and for supplying a result to the output means.

8. A device according to claim 6, in which the calculation means also comprises:

a second storage means for storing a first table containing values of the first coefficient and a second table containing values of the second coefficient, and a means for extracting a first coefficient from the first table and a second coefficient from the second table, as a function of the luminance of the received point and of the luminance of the previously stored point corresponding to the received point.

9. A device according to claim 8, including a means for selecting, as a function of an ambient temperature, the first table and the second table from among a plurality of first tables and a plurality of second tables as a function of the temperature, each first table of the plurality of first tables and each second table of the plurality of second tables being associated with a temperature range, and for storing the first table and the second table in the calculation means.

10. A display screen, comprising a video controller, a display device and a conversion device according to claim 6, the conversion device being coupled between the video controller and the display device.

11. A display screen according to claim 10, including a switching means, to couple the conversion device between the video controller and the display device or to couple the video controller and the display device.

* * * * *